UNITED STATES PATENT OFFICE 2,615,885

PREPARATION OF DEGRADED ALLYL STARCH

Kenneth C. Hobbs, Berwyn, Ill., assignor to Corn Products Refining Company, New York, N. Y., a corporation of New Jersey No Drawing. Application January 19, 1948, Serial No. 3,170

10 Claims. (Cl. 260—233.3)

This invention relates, generally, to the preparation of allyl starch, and more particularly, allyl starch which is soluble in organic solvents.

The primary reaction involved in the preparation of allyl starch is considered to be one between an alkali starch complex and an allyl halide. In carrying out this reaction, the alkali starch complex may be either pre-prepared and used as such or prepared in situ from starch and alkali in proper concentration and quantity to yield the complex. Prior to this invention, it was considered necessary to carry out this primary reaction in the presence of a non-reactant, organic solvent such as toluene, acetone, dioxane or isopropyl alcohol.

When the allyl halide used in the primary reaction is allyl chloride, it previously has been inconvenient to obtain an allyl starch product which is soluble in organic solvents.

One important object of this invention is the provision of a method of preparing allyl starch by reaction between an allyl halide and an alkali starch complex (either pre-prepared or prepared in situ), wherein an excess of allyl halide over that required in the reaction is used as the reaction medium.

Another important object of the invention is the provision of a method of preparing allyl starch, using allyl chloride as the reactive allyl halide, wherein the allyl starch initially formed is first degraded to soluble form and then purified in an acidified water-immiscible alcohol without precipitation of the allyl starch.

Certain other objects of the invention will, in part, be obvious and will, in part, appear hereinafter.

For a more complete understanding of the nature and scope of the invention, reference may be had to the following detailed description thereof wherein a number of presently preferred embodiments of the invention are given by way of illustration in the specific examples.

It has been found that under certain conditions, starch reacts with alkali metal hydroxide to form an alkali starch complex which undergoes the typical reactions of an alkoxide. This alkali starch complex may be prepared by mixing starch with at least a sufficient amount of a suitable organic liquid such as isopropyl alcohol or allyl halide to wet the starch, and then reacting such wetted starch, preferably under conditions of agitation, with an aqueous alkali hydroxide at a concentration of at least 35 percent. It may also be prepared in situ by merely mixing together starch, alkali metal hydroxide and allyl halide. It was further found that insofar as the primary reaction resulting in allyl starch is concerned, the content of alkali in the alkali starch complex determines the consumption of the allyl halide in the reaction. Thus, if the alkali starch complex contains only 2 moles of alkali per glucose residue, then no more than 2 moles of allyl halide can be consumed in the primary reaction resulting in allyl starch. Accordingly, when an excess of allyl halide is used as the reaction medium in accordance with this invention, this excess can be readily recovered.

This expedient has been found to provide several important advantages. In the first place, it is obviously an advantage in this type of reaction to utilize an excess of one of the reactants as the reaction medium, rather than a non-reactive organic solvent. A much more significant advantage is the marked increase in the rate of the primary reaction which is obtained.

The invention has been found to be generally applicable to starch irrespective of its type and source. Thus, the starch may be derived from plant sources, such as corn (maize), potato, tapioca, wheat, rice, waxy maize, grain sorghum, etc. The starch may be unmodified, or it may be modified in conventional manner. Starch fractions, i. e., amylose or amylopectin, may be used.

Allyl chloride and allyl bromide are the preferred allyl halides. Although allyl bromide offers certain procedural advantages, as will appear hereinafter, it is considerably more expensive than allyl chloride and, hence, the latter will generally be used in plant scale operations.

However, when allyl chloride is used, the allyl starch initially formed is relatively insoluble in organic solvents. Therefore, a second stage in the process is required wherein the initial insoluble product is solubilized, presumably through degradation since there is little or no increase in the degree of etherification in this second stage. Normally, this second stage requires considerable time, e. g. 6 to 11 hours. However, according to the present invention, it has been found possible to very materially shorten this period by carrying out the degradation step in an acidified water-immiscible solvent, preferably an alcohol. Thus, when the water-immiscible solvent is n-butyl alcohol, the degradation step can be carried out in approximately 30 minutes.

Not only is the time required to degrade the allyl starch greatly shortened by employing the acidified water-immiscible alcohol, but also it has been found that the solubilized allyl starch may be readily purified by aqueous extractions without causing the allyl starch to be precipitated as a gum. From a practical operating standpoint, this is a very important advantage since it avoids the inconvenient kneading of a gummy mass with water which has been previously required.

The following example will illustrate the presently preferred embodiment of the invention:

EXAMPLE 1

Eight hundred parts of corn starch are slurried in 2200 parts of allyl chloride in an autoclave. The slurry is cooled to 25° C. or below, and 710 parts of 50 percent sodium hydroxide are added with good agitation. The autoclave is sealed and the contents heated to 95° to 100° C. After holding at this temperature for one hour, the autoclave is opened and the contents are diluted with 4400 parts of n-butyl alcohol. The pH of the mixture is adjusted to 1.0 by the addition of hydrochloric and the excess allyl chloride (1475 to 1500 parts) is recovered by distillation. The temperature of the allyl starch solution is raised to 90° to 100° C. during the final stages of the distillation and is held within this range for 30 minutes in order to degrade the allyl starch to a soluble stage. The mixture is then cooled and extracted with water until neutral and free of salt and other water-solubles. The final step consists of concentrating the n-butyl alcohol solution of solubilized allyl starch to the desired concentration. The allyl starch product contains from 1.5 to 1.7 allyl groups per glucose residue and is readily soluble in organic solvents, such as dioxane, toluene, etc. The concentrated allyl starch solution is adapted to be conveniently handled and stored, and is in a condition ready for use.

The foregoing process may be modified in a number of respects. Insofar as the excess of allyl chloride over that consumed in the primary reaction is concerned, it is preferred to use enough so that the reaction mixture will be fluid and easy to handle. There appears to be no advantage in using more than this, while smaller amounts result in the mixture becoming increasingly more viscous and difficult to handle.

In the above example, the amount of sodium hydroxide used (i. e. 355 parts, dry basis) is equivalent to 2 moles per glucose residue. However, the ratio of alkali to starch may be as low as 1.5 and as high as 4.0. The optimum concentration of the aqueous alkali solution is within the range of 35 to 60 percent. Lower concentrations result in increasing losses of the allyl halide through hydrolysis. On the other hand increased concentrations tend to decrease the rate of reaction and, also, decrease the fluidity of the reaction mixture. Potassium hydroxide may be used, but it is more expensive and appears to offer no advantage.

With respect to the temperature at which the primary reaction is carried out, this should be within the range of 80° to 100° C., with 95° to 100° C. being the preferred range. Because these temperatures are well above the boiling point of allyl chloride, the reaction must be carried out under pressure in a closed vessel. The reaction is exothermic and no additional heat is required after the reaction has been initiated.

At any given temperature, the reaction time depends primarily on the concentration of the alkali. It should be long enough so that after completion, the reaction mixture is at least nearly neutral. When a 40 per cent concentration of alkali is used, the time at 100° C. may be reduced to about 30 minutes.

Enough n-butyl alcohol is used to dissolve the allyl starch formed. However, the exact amount is not critical. Instead of n-butyl alcohol, a mixture of amyl alcohols or other water-immiscible alcohols may be used. Solutions of allyl starch in these solvents may be extracted with water without causing the allyl starch to precipitate. Alcohols are preferred for this purpose because the conditions for the rupture of the glycosidic linkages are more favorable with an alcohol than with an inert solvent.

The concentration of the hydrochloric acid in the n-butyl alcohol may be varied considerably depending upon the degradation time and temperature used and the degree of degradation desired. A concentration within the range of 1.0 percent to 2.5 percent based on the weight of the original starch may be used. If desired, an equivalent amount of strong sulfuric acid may be used instead of hydrochloric acid.

The temperature at which the degradation is carried out may be varied considerably depending upon the concentration of strong acid in the water-immiscible alcohol, and the time of degradation. The latter factor may vary between 15 minutes to 90 minutes.

The following examples will serve further to illustrate the invention:

EXAMPLE 2

To a moist mixture of 18 g. of corn starch and 5 ml. of 91 per cent isopropyl alcohol was added 32 g. of a 50 percent sodium hydroxide solution. After a few minutes of vigorous stirring, an exothermic reaction occurred and the mixture progressively changed from a smooth slurry to a semi-dry powder. This pre-prepared alkali starch complex was transferred to a 500 ml. three-necked round bottom flask and 135 ml. (190 g.) of allyl bromide was added. The total weight of this mixture was 240 g. The mixture was rapidly heated to reflux temperature (66° C.), and samples were removed during the course of the reaction. These samples were titrated to phenolphthalein end point with 0.0987 N hydrochloric acid in order to determine the rate of alkali consumption, which in the early stages is considered to be nearly identical with the rate of etherification. It has been demonstrated that allyl halides are hydrolyzed very slowly in concentrated alkali solutions. The following table shows that sufficient alkali was consumed during the first 2 minutes to give a product having two allyl groups per glucose residue, for 4 moles of alkali per glucose residue was originally present:

TABLE I

Rate of reaction between alkali starch complex and allyl bromide at 66° C.

| Time, Minutes | Percent of NaOH Consumed | Moles of NaOH Consumed Per Glucose Residue |
|---|---|---|
| 2 | 51.6 | 2.06 |
| 9 | 48.0 | 1.92 |
| 28 | 61.5 | 2.46 |
| 41 | 66.7 | 2.67 |

After a total of 70 minutes, the reaction was discontinued and the product was found to be soluble in dioxane. The product was purified by a rapid steam distillation followed by several water washes. Analysis by the Wijs method for determining unsaturation showed the presence of 1.74 allyl groups per glucose residue.

EXAMPLE 3

The above experiment was repeated except that no samples were removed and the reaction was discontinued after 30 minutes at reflux temperature. The resulting allyl starch was nearly completely soluble in dioxane. The degree of substitution was found to be 1.80 allyl groups per glucose residue.

EXAMPLE 4

The procedure given in Example 3 was repeated three times, except that one reaction was discontinued after one hour, the second after 2 hours and the third after 3 hours at reflux temperature. No improvement in solubility or in the degree of substitution was observed with longer reaction times.

EXAMPLE 5

To a suspension of 18 g. of corn starch in 200 ml. of allyl chloride was added a solution containing 12 g. of sodium hydroxide in 10 ml. of water. The suspension was warmed on the steam bath until a reaction occurred between the starch and the alkali. The mixture was then transferred to a one-pint pressure bottle and the bottle sealed. The bottle was placed in a steam bath at 100° C. After 11 hours, a clear yellow solution of allyl starch in the excess allyl chloride and a layer of moist sodium chloride were present. The mixture was purified by simply decanting the allyl chloride solution which was then diluted with 100 ml. of toluene, and the excess allyl chloride was recovered by distillation. This left a clear solution of allyl starch in toluene which was ready for use. The product was found to contain 1.78 allyl groups per glucose residue. This experiment demonstrated the length of time which is required to degrade allyl starch to a soluble stage by heating in allyl chloride.

EXAMPLE 6

A mixture containing 18 g. of corn starch, 200 ml. of allyl chloride, 8 g. of sodium hydroxide and 7 ml. of water was treated in the same manner described in Example 5. In this experiment only two moles of alkali were added instead of three. The product obtained was found to contain 1.8 allyl groups per glucose residue.

EXAMPLE 7

Three reactions were carried out using the quantities used in Example 6. One reaction was discontinued after 2 hours, one after 4 hours and one after 7 hours of reaction at 100° C. The contents of all three flasks were acidic to phenolphthalein. The 2 and 4 hour samples were white gums which were not soluble in the excess allyl chloride. The 7 hour sample was in the form of a nearly clear sirup. These experiments show that the etherification reaction is complete in less than 2 hours under these conditions, but that additional time is require to degrade the product to a soluble state.

EXAMPLE 8

A solution of 120 g. of sodium hydroxide in 100 ml. of water was added at room temperature to a slurry of 180 g. of corn starch in 200 ml. of allyl chloride. Gentle heating caused the alkali starch complex to form with the evolution of a considerable amount of heat. A nearly dry alkali starch complex resulted which weighed 400 g. Forty g. of this material was reacted with 60 ml. of allyl chloride at 100° C. for one hour. It was found that 1.6 moles of alkali per glucose residue had been consumed.

A second 40 g. of the alkali starch complex was reacted with 60 ml. of allyl chloride at 100° C. for 2 hours. This product was found to contain 1.7 allyl groups per glucose residue, but it was not completely soluble in organic solvents. This product was added to 100 ml. of n-butyl alcohol which contained one ml. of concentrated hydrochloric acid. The mixture was heated on the steam bath for 4 hours during which the viscosity progressively decreased and the solution became clear. The solution was neutralized to phenolphthalein end point with one N sodium hydroxide. The degraded product in solution in n-butyl alcohol was purified by aqueous extractions in a separatory funnel. Due to the low solubility of water in n-butyl alcohol, the product was not precipitated as a gum.

EXAMPLE 9

A solution containing 8.0 g. of sodium hydroxide in 9.8 ml. of water was added to a mixture of 18 g. of corn starch and 10 ml. of allyl chloride. A dry alkali starch complex formed to which was added 80 ml. of allyl chloride. This mixture was heated for 2 hours at 95° C. A soft white mass of allyl starch covered with excess allyl chloride resulted. This was diluted with 100 ml. of n-butyl alcohol containing one ml. of concentrated hydrochloric acid. The excess allyl chloride was removed by distillation (62 ml. recovered) and the temperature was held at 88° C. for 30 minutes. A clear fluid solution resulted which was extracted with three ml. portions of water in a separatory funnel, and the alcohol solution was concentrated under vacuum to a heavy sirup. The product contained 1.57 allyl groups per glucose residue.

EXAMPLE 10

Six preparations of allyl starch were carried out in the same manner as that described in Example 9, except that the reaction time between allyl chloride and alkali starch was only one hour. The samples were degraded in acidified n-butyl alcohol for varying lengths of time at 100° C. and purified to give a series of 50 percent solutions of allyl starch in n-butyl alcohol in which the viscosity varied from 6.0 to 22.7 poises at 25° C. The degree of substitution ranged from 1.45 to 1.65 allyl groups per glucose residue.

EXAMPLE 11

A solution containing 8.0 g. of sodium hydroxide in 12 ml. of water was added to a slurry of 18 g. of corn starch in 12 ml. of allyl chloride. The mixture was stirred until the alkali starch complex formed and an additional 38 ml. of allyl chloride was added. Seven identical mixtures were prepared. The reactions were carried out at 100° C. and one was discontinued after 15 minutes, two after 30 minutes, two after 45 minutes, and two after 60 minutes. Each reaction mixture was immediately cooled, and the total alkalinity in one sample from each set was determined by titrating an aqueous suspension of the product to phenolphthalein end point with one N hydrochloric acid. The duplicate sample of each set was degraded in acidified n-butyl alcohol, the sample purified and analyzed for allyl content. The results are as follows:

| Reaction Time, Minutes | Moles of NaOH Consumed Per Glucose Residue | Allyl Groups Per Glucose Residue |
|---|---|---|
| 15 | 1.48 | |
| 30 | 1.95 | 1.45 |
| 45 | 1.99 | 1.47 |
| 60 | 2.00 | 1.50 |

This shows that the etherification reaction is essentially complete in a little more than 15 minutes.

When allyl bromide is used as the reactant allyl halide, the allyl starch formed appears to be soluble in organic solvents, and a degradation step is not required to produce a soluble product as in the processes wherein allyl chloride is utilized. However, degradation may be necessary to give an allyl starch having the desired viscosity. Because of its higher boiling point, the reactions using allyl bromide need not be carried out under pressure.

What is claimed as new is:

1. In the process of preparing allyl starch soluble in organic solvents, the improvement which comprises reacting alkali starch complex with allyl chloride to form allyl starch, and degrading the allyl starch in the presence of an acidified water-immiscible alcoholic solvent for the degraded allyl starch.

2. The process of preparing allyl starch which comprises reacting alkali starch complex with allyl chloride in the presence of at least a sufficient excess of allyl chloride to prevent the reaction mass from solidifying and in the absence of any other organic solvent, adding acidified water-immiscible alcohol to the reaction mixture, heating the mixture to distill off excess allyl chloride and degrade the allyl starch to a soluble stage, and washing with water the resulting solution of soluble allyl starch in said water-immiscible alcohol to remove water-soluble impurities therefrom.

3. The process of claim 2 wherein the water-immiscible solvent is n-butyl alcohol.

4. The process of claim 2 wherein the water-immiscible solvent is acidified with hydrochloric acid.

5. The process of preparing allyl starch which comprises admixing starch with sufficient aqueous sodium hydroxide of 40 percent to 60 percent strength to provide 1.5 to 4.0 moles of sodium hydroxide, dry basis, to each glucose residue and with an excess of allyl chloride at least sufficient to prevent the reaction mass from solidifying, heating the admixture in a closed vessel at a temperature within the range of 80° to 100° C. until the reaction mass is at least approximately neutral, adding to the reaction mass sufficient n-butyl alcohol to dissolve the allyl starch formed, said n-butyl alcohol being acidified with from 1.0 percent to 2.5 percent of hydrochloric acid expressed as hydrogen chloride, based on the weight of the starch, heating the reaction mass to distill off the excess allyl chloride and to degrade the allyl starch, and extracting the resulting solution of allyl starch in n-butyl alcohol with water to remove water-soluble impurities therefrom.

6. The process of claim 5 wherein the last amounts of said excess allyl chloride are distilled off at a temperature within the range of 90° to 100° C. and the reaction mass is held at such temperature for at least 30 minutes.

7. The process of preparing allyl starch which comprises slurrying 800 parts of starch with approximately 2200 parts of allyl chloride, adding to said slurry while maintained at a temperature not in excess of 25° C. approximately 710 parts of a 50 percent aqueous sodium hydroxide solution, heating the reaction mass in a closed vessel to a temperature within the range of 95° to 100° C. for approximately one hour, diluting the reaction mass with approximately 4400 parts of n-butyl alcohol, adjusting the pH of the mixture to 1.0 by the addition of hydrochloric acid, recovering the excess allyl chloride from the reaction mass by distillation, the final stages of which are carried out at a temperature within the range of 90° to 100° C. with the reaction mass being maintained at such temperature for approximately 30 minutes, cooling the reaction mass, extracting the cooled reaction mass with water until neutral and free of salt, and concentrating the resulting solution of allyl starch in n-butyl alcohol.

8. A process of preparing organic solvent soluble allyl starch comprising allylating starch by heating it with allyl chloride in the presence of concentrated aqueous alkali metal hydroxide solution and in the absence of an organic solvent thereby forming organic solvent insoluble allyl starch, and after substantial completion of the allylation adding acidified n-butyl alcohol to the resulting reaction mixture and continuing the heating in the n-butyl alcohol to render the allyl starch soluble therein.

9. A process of preparing organic solvent soluble allyl starch comprising allylating starch by heating it with allyl chloride in the presence of concentrated aqueous alkali metal hydroxide solution and in the absence of an organic solvent thereby forming organic solvent insoluble allyl starch, and after substantial completion of the allylation adding acidified water-immiscible alcohol to the resulting reaction mixture and continuing the heating in said water-immiscible alcohol to render the allyl starch soluble therein.

10. The process of claim 9 wherein the water-immiscible solvent is acidified with hydrochloric acid.

KENNETH C. HOBBS.

REFERENCES CITED

The following references are of record in the file of this patent:

UNITED STATES PATENTS

| Number | Name | Date |
|---|---|---|
| 1,805,365 | Huber | May 12, 1931 |
| 2,096,114 | Lorand | Oct. 19, 1937 |
| 2,397,732 | Gaver | Apr. 2, 1946 |
| 2,413,463 | Nichols et al. | Dec. 31, 1946 |